United States Patent [19]

Baumgärtel

[11] 4,079,110

[45] Mar. 14, 1978

[54] FORMATION OF CONNECTING SLEEVE ON A PIPE OF THERMOPLASTIC MATERIAL

[75] Inventor: Christof Baumgärtel, Erlangen, Germany

[73] Assignee: Rehau Plastiks GmbH, Rehau, Germany

[21] Appl. No.: 630,008

[22] Filed: Nov. 7, 1975

[30] Foreign Application Priority Data

Nov. 9, 1974 Germany .................... 2453272

[51] Int. Cl.² ........................................... B29C 1/14
[52] U.S. Cl. .................................... 264/89; 264/322
[58] Field of Search ............ 264/89, 322; 425/387 R, 425/393

[56] References Cited

U.S. PATENT DOCUMENTS

| | | | |
|---|---|---|---|
| 2,458,854 | 1/1949 | Hull | 425/393 |
| 3,432,887 | 3/1969 | Poux | 425/387 |
| 3,706,519 | 12/1972 | Soethje | 264/322 X |
| 3,849,052 | 11/1974 | Gordon | 425/387 |
| 3,899,565 | 8/1975 | Putter | 264/322 X |
| 3,923,952 | 12/1975 | La Branche | 264/322 X |

*Primary Examiner*—Richard R. Kucia
*Attorney, Agent, or Firm*—Spencer & Kaye

[57] ABSTRACT

In order to provide the end of a pipe of thermoplastic material with a connecting sleeve presenting an outwardly projecting annular bulge, the pipe end is heated to the deformation temperature of the plastic material, is then introduced into the annular gap formed between a sleeve mandrel and an outer mold formed to have an annular recess presenting a free bulge space in a widening and compressing device, the surface of the mandrel being formed to have a constriction opposite the annular recess in the mold, the pipe end is widened in the sleeve region by the mandrel and is simultaneously compressed in the axial direction until it fills the annular gap, then the axial advancing force required to push the heated pipe end and to compressively deform it is increased while there is simultaneously applied a supporting pressure to the pipe in the region of the free bulge space and in the direction from the sleeve mandrel toward the outside until the pipe wall material, under the influence of the advancing force and the supporting pressure, bulges into the free bulge space, and finally, while maintaining the increased advancing force, the supporting pressure in the region of the free bulge space is increased to a compression pressure value which presses the bulged pipe wall material against the peripheral outline of the recess in the outer mold.

4 Claims, 3 Drawing Figures

FORMATION OF CONNECTING SLEEVE ON A PIPE OF THERMOPLASTIC MATERIAL

BACKGROUND OF THE INVENTION

The present invention relates to the shaping of connecting sleeves, or sockets, having an annular bulge on the end of pipes made of a thermoplastic material.

In this operation, such a pipe is heated to the deformation temperature of the plastic material and is pushed into an annular gap formed between a sleeve mandrel and an outer mold, with a free space for the bulge in a widening and compressing device, whereby the sleeve is widened by the sleeve mandrel. The mandrel is provided with a circumferential constriction in the area below the free bulge space and at the same time the pipe is compressed in the axial direction until the annular gap is filled and the initial wall thickness has been increased.

There are various known methods for shaping connecting sleeves having annular bulges on plastic pipes. In one known method, the sleeve and the annular bulge are shaped, after the heated pipe end has been introduced into the annular gap between the outer mold and the sleeve mandrel, by means of movable segments in the sleeve mandrel. This method has the drawback that, due to the movable segments in the sleeve mandrel, it is rather expensive to practice the method primarily since the preparation time and costs are increased.

In a further known method sleeves with annular bulges are shaped with the use of a smooth non-dismantlable mandrel. Thus, for example, the method disclosed in German Offenlegungsschrift (Laid-Open Application) No. 1,924,557, utilizes a smooth sleeve mandrel which is enclosed by an outer mold having an elastic bulge region. The annular bulge is shaped in this process by pressing a defined quantity of an uncompressible medium through openings in the sleeve mandrel into the area of the bulge. The area of the bulge is here sealed against the incompressible medium so that it cannot escape. This is clearly a high-pressure shaping process which is difficult to handle. The drawback of this process is, in particular, the requirement for a defined quantity of incompressible medium whose volume might be changed after each pressing process by residual quantities which remain in the inlet channels. Blowing out the feed channels to prevent such residual quantities upon completion of a shaping process would lead to the loss of the remainder of the incompressible medium and would thus correspondingly increase costs. The result is sleeves with bulge shapes of different sizes and thus a significant reduction in quality. Moreover, when the shaped sleeve bulge region is removed from the sleeve mandrel a portion of the incompressible medium is inevitably left in the sleeve which in addition to renewed loss of medium brings about the requirement for a subsequent cleaning of the shaped pipe section.

German Offenlegungsschrift No. 2,213,561 discloses a further process for forming a sleeve having an annular bulge on the end of a pipe of a thermoplastic material in which a pipe end which has been heated to the required deformation temperature is pushed onto a smooth sleeve mandrel. During this process the end of the pipe is intially widened to the desired size of the sleeve. In a further process step, a compression ring is moved in the direction opposite to the insertion direction to compress the inserted and widened pipe end to such an extent that the annular gap between the sleeve mandrel and the outer mold is filled completely. For a special reinforcement of the sleeve in the region of the bulge, the sleeve mandrel is provided with a circumferential constriction which extends over the area of the bulge and which is also filled with the plastic material during the compression process.

Upon completion of the compression process, a further ring in the outer mold is moved back in the direction of insertion of the pipe to release the bulge area. Thereafter, compressed air is forced through bores in the sleeve mandrel into the bulge area so that the bulge is formed. This known process requires complicated apparatus and is thus limited in its economical use. Moreover, due to the fact that the bulge has to be freed after the compression process by movement of the ring, it is possible to produce only rectangular bulge shapes with this process. Wedge-shaped, circular or other shapes cannot be realized with this process.

U.S. Pat. No. 3,432,887 discloses a procedure in which first a mandrel is inserted into the preheated pipe end in order to initially widen the sleeve region and at the end of the inward stroke of the mandrel, axial compressive forces are applied to deform the sleeve. During this operation, compressive stresses are induced in the pipe material in the region of the bulge. After completion of this compressive deformation, when substantially no axial pressure is imposed on the pipe, air under pressure is introduced into the space enclosed by the pipe in the region of the bulge to blow the bulge outwardly. This induces tensile stresses in the plastic material which do not nullify the compressive stresses because of the successive nature of the operations.

SUMMARY OF THE INVENTION

It is an object of the present invention to provide a technically simple process for forming connecting sleeves having annular bulges, or beads, on pipes of a thermoplastic material, in which different bulge shapes can be produced without problems by corresponding configurations in the outer mold.

This and other objects of the invention are achieved by increasing the advancing force required to push the heated pipe end and to compress it, while simultaneously applying a supporting pressure in the direction from the sleeve mandrel toward the outside on the pipe wall material which covers the free bulge area, the advancing force being increased until the pipe wall material bulges into the free bulge area under the influence of the advancing force and the supporting pressure, and while maintaining the increased advancing force, increasing the supporting pressure in the region of the free bulge area to a level which causes it to become a compression pressure which presses the bulged pipe wall material against the peripheral contour of the bulge area defined by the outer mold.

In the process according to the invention the heated pipe end is pushed into the closed mold, introduction and compression occurring simultaneously. This requires no additional mold pieces, such as to produce the compression pressure, etc. The beginning of the shaping of the bulge in the process of the present invention is coupled with the beginning of the compression process. At the instant when the advancing force required to compressively deform the heated pipe end is increased beyond the force required to push it in, the supporting pressure simultaneously begins to appear below the pipe wall section covering the free bulge area. This supporting pressure acts in cooperation with the advancing force on this pipe wall section until the latter bulges into the free bulge area. This bulge is produced only when the compressive deformation process has been completed and the annular gap formed between the sleeve mandrel and the outer mold has been completely filled with the pipe wall material.

Upon completion of the bulging process, the increased advancing force is maintained and the supporting pressure acting in the area of the free bulge space on the covering pipe wall material is increased to a compression pressure value so that the bulged pipe wall material is pressed against the peripheral outline of the bulge area. This pressing of the pipe wall material against the outline of the circumferential bulge permits the production of any desired shape of bulge.

The sleeve mandrel employed in the practice of the method of the invention having a reduced diameter in the area of the free bulge space provided in the outer mold, produces an optimum compressive deformation operation. The length of the constriction along the axis of the sleeve mandrel is dimensioned so that it is in the shape of a parabola and returns to the normal mandrel diameter at the points where the radii of the bulge in the outer mold end at both axial extremities of the bulge.

Optimum compressive deformation according to the process of the invention is produced in that the heated pipe end which is placed onto the mandrel completely contacts the mandrel due to its elasticity and follows the contour of the mandrel. As soon as the pipe end contacts the end of the annular gap formed between the outer mold and the sleeve mandrel and the advancing force continues to act on the heated pipe area, the pipe material will tend to bend out into the area of the free bulge area. Due to the constriction provided in the sleeve mandrel, such bending is prevented until the cylindrical region of the annular gap formed in the outer mold ahead of and behind the free bulge space has been filled with the pipe wall material. After filling of the annular gap, the compressive stress in the free bead area produces a uniform bulging of the pipe wall material disposed below the free bulge area so that damaging crease formation is made impossible. With this type of compressor and bulging, the supporting pressure which supports the bulging process can be kept relatively low so that only a small amount of expansion of freely compressed bulge area takes place. This slight expansion produces fewer stresses in the final product so that the usefulness and stability of such products is substantially augmented.

In contradistinction to prior art methods, the process of the invention produces the force required to shape the bulge mainly by means of the compressive deformation process. This requires an advantageous distribution of the stress conditions in the sleeve-bulge area of a pipe end shaped according to the invention, which leads to a higher quality of the shaped articles. The compressive deformation process itself already begins when the pipe end is pushed over the mandrel by the friction against the mandrel resulting therefrom. The actual deformation begins when the pipe end abuts the end of the mold cavity. The mold cavity is filled by the deformation pressure which depends on the pipe and uncontrollable bulging or creasing of the pipe wall material into the free bulge space is prevented. This is done with the aid of the radial constriction in the mandrel below the free bulge space, which constriction is filled during the deformation process thus reinforcing the cross-sectional area of the pipe in this region. Only when this filling process and thus the deformation process as a whole is completed will the reinforced pipe wall material be bulged into the free bulge space while maintaining the deformation pressure so that with an increase in the supporting pressure to the level of the compression pressure, the pipe wall material is pressed against the bulge outline in the outer mold.

Apparatus for practicing the invention may advantageously include a smooth heatable mandrel and an axially divided heatable and coolable outer mold, at least one bore extending inside the mandrel in the axial direction to the circumferential bulge region formed in the mold jaws and being in communication by means of radially directed bores or annular gap, with the cavity defining the peripheral bulge. The mold cavity can be sealed in its front and rear regions by suitable sealing means. In the frontal portion of the mold cavity, the sealing means will advantageously be a cutting ring seal. The end of the pipe introduced into the mold cavity firmly contacts this cutting ring seal so that escape at this point of the air utilized as the supporting and compression pressure is prevented.

In the rear end region of the mold cavity at the end of the pipe the sealing means will advisably be a lip seal disposed in the mandrel where the exposed lip firmly contacts the inner circumference of the inserted pipe so that it acts as a seal against the outside.

It may further be of advantage for the mold jaws to be provided with ventilation bores which extend into the cavity of the circumferential bead through which, during pressing of the pipe wall material against the peripheral outline of the bead space by means of the compression pressure, the air disposed in the free bead space outside the pipe material can escape.

DESCRIPTION OF THE PREFERRED EMBODIMENTS

Figure 1:
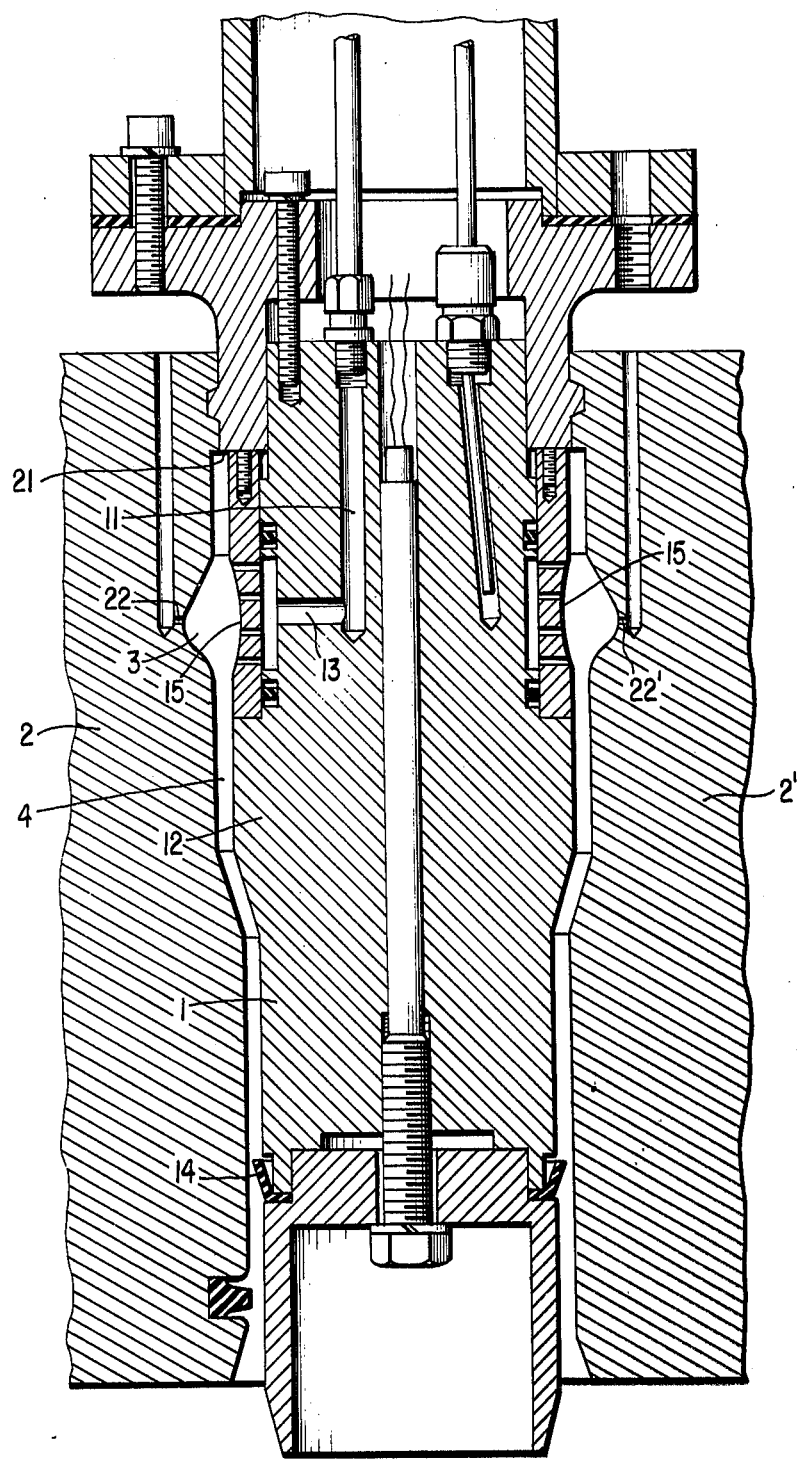
FIG. 1 is a cross-sectional view of one embodiment of apparatus for forming pipe sleeves according to the present invention.

FIG. 1 shows apparatus according to the invention including an outer mold composed of jaws 2, 2' and a sleeve mandrel 1 provided with an axial bore 11 which extends into the axial region delimited by the free bulge region 3 and from which radially directed bores 13 enter into the mold cavity 4 in the area of the free bulge region 3. In the front portion of the mold cavity 4, a cutting ring seal 21 is shaped to the frontal face abutment. At the rear end of mold cavity 4, on the side of the pipe, a lip seal 14 is provided in the mandrel 1 so that firm contact of the mold lip to the inner periphery of the pipe, which is not shown in the drawing, is assured when the pipe has been inserted. At the highest point of the cavity of the annular bulge region 3, ventilation bores 22, 22' are provided which extend through the mold jaws 2, 2' and through which the air which is pushed during pressing of the pipe wall material against the outer boundary of the annular bulge region can escape.

Below the space 3, in the outer molds 2, 2' a radial constriction 15 is formed in the sleeve mandrel to effect reinforcement of the bulge area during shaping of the sleeve bead part.

The above-described apparatus constitutes only one advantageous device for practicing the method of the invention. It is not intended to limit the invention to this embodiment.

In one molding process practiced according to the invention, a pipe of the type NW 50 was heated, at the end to be shaped, to a deformation temperature of about 120° C. The heatable outer mold of the shaping tool was also heated to this temperature. The heatable sleeve mandrel was heated to a temperature of about 75° C. After the pipe end had been brought to the deformation temperature, it was placed into the annular gap between the sleeve mandrel and the outer mold whereby the advancing force automatically increased to a set compressive deformation pressure when the pipe end abutted the end of the outer mold which defined the annular gap. Simultaneously with the establishment of the axial compression pressure, a supporting pressure was directed onto the pipe wall material covering the free bulge space through corresponding openings in the sleeve mandrel, an air pressure of 2 atmospheres absolute being used.

Upon completion of the compressive deformation process, and with the beginning of bulging of the pipe wall material into the free bulge space as a result of the further action of the compressive deformation pressure in conjunction with the supporting pressure, the supporting pressure was increased from 2 atmospheres absolute to a compression pressure value of 6 atmospheres absolute. With this compression pressure, the pipe wall material was pressed against the peripheral outlines of the bulge space and the bulge, or bead, was thus completely shaped.

Upon completion of the shaping process the compression pressure value of the supporting pressure was maintained for a short period of time and the outer mold as well as the sleeve mandrel were cooled so that the pipe wall material began to solidify to below the deformation temperature. The pipe with the shaped sleeve bulge, or bead, contour was then removed from the sleeve mandrel after the axially divided outer mold had been removed.

With the process of the invention and with the aid of the proposed apparatus it is possible for the first time to shape the sleeve beads in heated plastic pipe ends in one combined process step without the need for movable mandrel parts. Through the economical use of pressing and compressing forces, this process can produce an end product which has optimal utility value. The combination of the various operations into a single process step further permits economical production of such sleeve bead shapes so that in addition to the technical advantages of the process an increased economy factor results.

Moreover, the method according to the invention produces bulge regions which are substantially free of internal stresses since the compressive stresses produced during compression are almost completely nullified by the tensile stresses produced by the supporting pressure. Only during the final phase of increasing the supporting pressure to a level at which it becomes a compression pressure will slight tensile stresses develop in the bulge region. However, these stresses will be considerably lower than those existing in the material at the annular bulges produced according to prior art processes.

Figure 2:
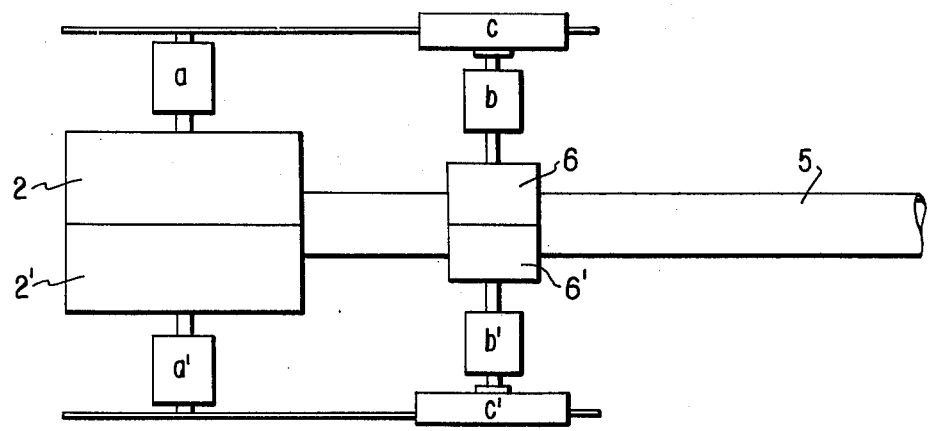
FIG. 2 is a schematic view of the mold with pipe clamping device and hydraulic equipment for axial and radial movement of the individual units.

FIG. 2 shows the mold jaws 2, 2' in closed position. The schematically illustrated hydraulic cylinders a, a' serve as means for radially closing and opening the mold jaws 2, 2'. Pipe 5 is introduced in the mold. Pipe 5 is retained by surrounding clamping jaws 6, 6' which are radially pressed against pipe 5 by the hydraulic cylinders b, b' as shown in the drawing. The clamping jaws 6, 6' are opened by reversing the hydraulic cylinders b, b'. For producing the required compressive deformation pressure, the clamping device consisting of clamping jaws 6, 6' and hydraulic cylinders b, b' is pushed in axial direction towards the mold by the hydraulic cylinders c, c'. Upon completion of the deformation process the mold jaws 2, 2' are radially separated by the hydraulic cylinders a, a' and then the clamping device is axially moved by the hydraulic cylinders c, c' until the finished sleeve has left the mold. Subsequently the camping jaws 6, 6' are radially opened by the hydraulic cylinders b, b' and the pipe is removed.

The same result can be obtained by providing stationary clamping jaws 6, 6' in axial direction and movable mold jaws 2, 2' in both radial and axial direction. The compressive deformation force must be fully maintained from the beginning of the deformation process until the shaped sleeve has cooled down as otherwise the obtained compression would partly be released due to the compressive deformation stresses in the plastic material and on the other hand the shaped annular bulge would also be reduced due to lack of or insufficient compressive deformation pressure compared with the relatively low compression pressure.

Figure 3:
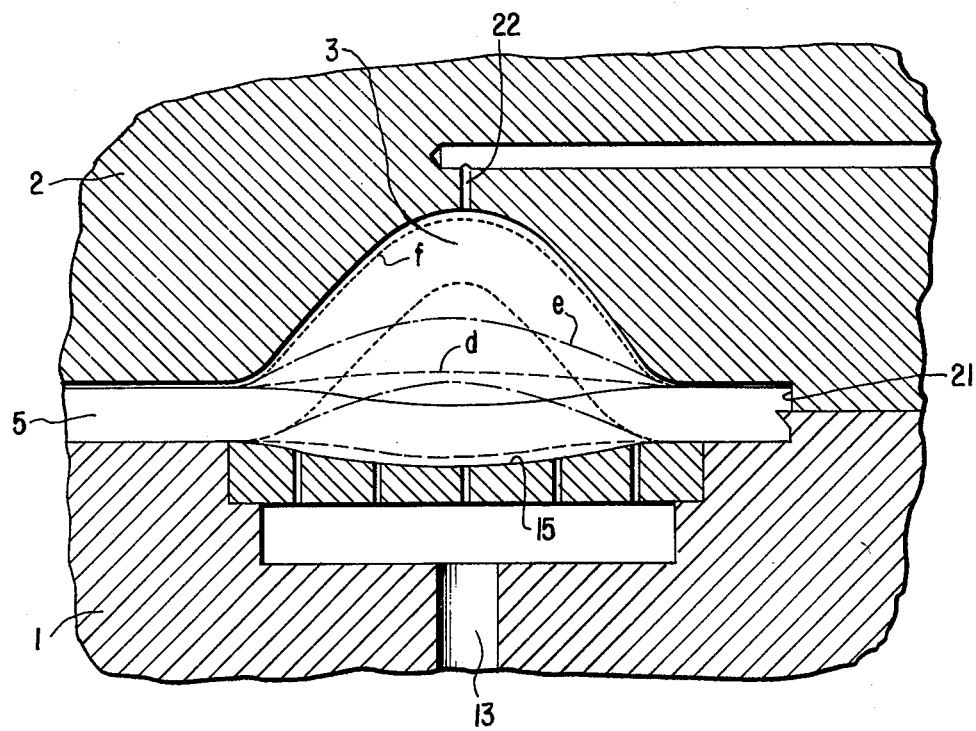
FIG. 3 is a schematic view of the operations during bulging of the pipe wall in the annular bulge region.

FIG. 3 is an enlarged schematic view of the annular bulge region of mandrel 1 and mold 2 of FIG. 1. Identical elements are provided with the same reference numbers as used in FIG. 1.

After pipe 5 has been introduced in mold cavity 4 and is in full contact with mandrel 1 and after sealing in the frontal region has been obtained by means of the cutting ring seal 21, the compressive deformation process is started by moving pipe 5 in axial direction as explained in the description to FIG. 2.

The drawing illustrates individual stages of this process, whereby the dashed line d illustrates the beginning of the bulging process. At this stage, mold cavity 4 is completely filled with pipe wall material.

The dot-dash line e illustrates the course of the pipe wall in the intermediate phase of deformation. Supporting pressure and compressive deformation pressure are unvariedly constant during this stage.

The dotted line f illustrates the final stage of the bulging process. At this stage of deformation, the supporting pressure is switched over to compression pressure, the still effective advance movement of the pipe is stopped and the compressive deformation force is maintained by fixing the advance unit.

As a result of the compression pressure, the pipe wall assumes exactly the contour of the outer mold in the annular bulge region. The shape of the annular bulge is fixed by cooling, as already described.

The illustration in FIG. 3 shows clearly the necessity for allowing the air which exists in the free annular bulge region 3 when starting the bulging process to escape through the ventilation bores 22. Otherwise, the resulting back pressure would prevent an exact shaping of the annular bulge.

It will be understood that the above description of the present invention is susceptible to various modifications, changes and adaptations, and the same are intended to be comprehended within the meaning and range of equivalents of the appended claims.

What is claimed is:

1. In a method for forming a connecting sleeve having an annular bulge at the end of a pipe of thermoplastic material, in which the end of the pipe is heated to the deformation temperature of the plastic material and introduced into the annular gap formed between a sleeve mandrel and an outer mold formed to have an annular recess presenting a free bulge space in a widening and compressing device, the surface of the mandrel being formed to have a constriction opposite the annular recess in the mold, the pipe end thus being widened in the sleeve region by the sleeve mandrel and simultaneously compressed in the axial direction until it fills the annular gap, thus reinforcing the initial wall thickness, the improvement comprising: increasing the axial advancing force required to push the heated pipe end and to compressively deform it while simultaneously applying a supporting pressure to the pipe in the region of the free bulge space and in the direction of from the sleeve mandrel toward the outside unitl the pipe wall material, under the influence of the advancing force and the supporting pressure, bulges into the free bulge space; and, while maintaining the increased advancing force, increasing the supporting pressure in the region of the free bulge space to a compression pressure value which presses the bulged pipe wall material against the peripheral outline of the recess in the outer mold, and wherein the sleeve mandrel is provided with at least one bore extending in the axial direction of the mandrel and terminating in the region of the constriction, and passages communicating with the axial bore and with the cavity region defined between the constriction and the annular recess, the bore and passages being connected for delivering pressure fluid to the region of the constriction to provide the supporting pressure and compression pressure, and the axial extremities of the annular gap are sealed by sealing means.

2. A method as defined in claim 1 wherein the sealing means at the end of the annular gap corresponding to the free end of the sleeve is constituted by a cutting ring seal.

3. A method as defined in claim 1 wherein the sealing means at the end of the annular gap corresponding to the end of the sleeve joining the remainder of the pipe is constituted by a lip seal disposed in the mandrel.

4. A method as defined in claim 1 wherein the outer mold is provided with ventilation bores communicating with the free bulge space.

* * * * *